US005527608A

United States Patent [19]
Kemp-Patchett et al.

[11] Patent Number: 5,527,608
[45] Date of Patent: Jun. 18, 1996

[54] ORIENTED MULTILAYER HEAT SEALABLE PACKAGING FILM CAPABLE OF WITHSTANDING HIGH ALTITUDE EFFECTS

[75] Inventors: Sharon J. Kemp-Patchett, Macedon; Robert G. Peet, Pittsford, both of N.Y.

[73] Assignee: Mobil Oil Corporation, Fairfax, Va.

[21] Appl. No.: 364,143

[22] Filed: Dec. 27, 1994

[51] Int. Cl.$^6$ .................................................. B32B 7/12
[52] U.S. Cl. .................. 428/349; 428/516; 428/910; 427/569; 427/576; 525/240
[58] Field of Search ............................. 428/349, 516, 428/910; 525/240; 427/569, 576

[56] References Cited

U.S. PATENT DOCUMENTS

| | | | |
|---|---|---|---|
| 4,214,039 | 7/1980 | Steiner et al. | 428/414 |
| 4,345,005 | 8/1982 | All et al. | 428/461 |
| 4,439,493 | 3/1984 | Hein et al. | 428/414 |
| 4,447,494 | 5/1984 | Wagner, Jr. et al. | 428/349 |
| 4,564,558 | 1/1986 | Touhsaent et al. | 428/349 |
| 4,870,122 | 9/1989 | Lu | 524/488 |
| 5,093,194 | 3/1992 | Touhsaent et al. | 428/349 |
| 5,194,318 | 3/1993 | Migliorini et al. | 428/215 |
| 5,223,346 | 6/1993 | Lu | 428/349 |

*Primary Examiner*—Edith Buffalow
*Attorney, Agent, or Firm*—Ronald A. Bleeker; Malcolm D. Keen; Laurence P. Hobbes

[57] ABSTRACT

A biaxially oriented heat sealable multilayer film structure, suited for use in high altitude applications, which comprises:

(a) a core substrate having two surfaces, comprising i) a layer of homopolymer polyolefin and ii) a layer of block copolymer of ethylene and propylene having a MFR of 1 to 10, adjacent to at least one side of i);

(b) a polymeric heat sealable layer on one surface of said core substrate, said heat sealable layer comprising a polymeric material selected from the group consisting of a terpolymer of ethylene, propylene and butene-1, a random copolymer of ethylene and propylene, a random copolymer of propylene and butene-1, and blends thereof; and optionally, (c) a high density polyethylene (HDPE) layer adjacent to the other surface of said core substrate (a).

18 Claims, No Drawings

ORIENTED MULTILAYER HEAT SEALABLE PACKAGING FILM CAPABLE OF WITHSTANDING HIGH ALTITUDE EFFECTS

FIELD OF THE INVENTION

This invention relates to a flexible multilayer heat sealable general purpose packaging film and to a method of forming the same.

BACKGROUND OF THE INVENTION

In the packaging of certain types of foods, such as cookies, potato chips, and the like, it is common practice to employ a multilayer film having two or more polymeric layers wherein one of the layers is known to be an effective heat seal layer. In the packaging process, a supply of such a multilayer film can be shaped into a tube in a vertical form and fill machine. Marginal regions of the heat seal layer are brought into face to face relationship and heat sealed together. Thereafter, the packaging machine automatically forms a heat seal and makes a horizontal severance across the bottom of the bag. Next, product is dispensed into the open end of the tube and, thereafter, a second horizontal seal is effected across the tube with a simultaneous severing through the tube to result in a product packaged in a tube, heat sealed at both ends and along one seam at right angles to the end seals. While the food or other product is being dispensed into the package, air is also present in the package and this air assists in protecting and cushioning the product during subsequent shipment of the finished packages. During shipment of the product, particularly with larger size bags, e.g., those containing 6 ounces of product, the bags have a tendency to split or burst at the end seals. This effect is particularly noticeable where the product is shipped to high altitude locations or shipped through such regions, e.g., over mountain ranges.

A multilayer wrapping film of the type having the above-mentioned utility is described in U.S. Pat. No. 4,214,039, the subject matter of which is, in its entirety, incorporated by reference herein. U.S. Pat. No. 4,214,039 describes a packaging film structure comprising a polypropylene film substrate having a heat sealable vinylidene chloride polymer containing at least 50 percent by weight of vinylidene chloride. In between the polypropylene film and the vinylidene chloride polymer is a primer coat which consists of the reaction product of an acidified aminoethylated vinyl polymer and an epoxy resin. This primer coat enhances the bond strength between the polypropylene and the heat sealable vinylidene chloride polymer.

U.S. Pat. No. 4,345,004, incorporated herein by reference relates to a homopolymer polypropylene core layer co-extruded with an ethylene propylene copolymer which is biaxially oriented. The copolymer layer is corona treated and subjected to metal coating by vacuum deposition.

U.S. Pat. No. 4,439,493 discloses an oriented heat sealable structure which comprises a polyolefin film substrate, a layer consisting essentially of a random copolymer of ethylene and propylene having from about 0.5% to about 6% by weight of ethylene on at least one surface of the substrate, a primer coating on at least one surface of the random copolymeric layer and a heat sealable layer on the primer coating, wherein the heat sealable layer comprises an interpolymer comprising a minor amount of acrylic acid, methacrylic acid or mixtures thereof and a minor amount of neutral monomer esters comprising methyl acrylate, ethyl acrylate or methyl methacrylate. U.S. Pat. No. 4,439,493 is incorporated by reference in its entirety for all that it discloses.

U.S. Pat. No. 4,447,494, incorporated by reference in its entirety, discloses another oriented heat sealable structure, this one comprising a polyolefin film substrate, a layer consisting essentially of a random copolymer of ethylene and propylene having from about 0.5% to about 6% by weight of ethylene on at least one surface of the substrate, a primer coating on at least one surface of the random copolymeric layer and a heat sealable layer on the primer coating, wherein the heat sealable layer comprises a vinylidene chloride copolymer containing at least 50% by weight of vinylidene chloride.

U.S. Pat. No. 4,564,558 discloses a multilayer oriented heat sealable structure, comprising a polyolefin film substrate, a layer comprising a terpolymer of propylene with ethylene and butene-1, a primer coating on at least one surface of the terpolymer layer and a heat sealable layer on the primer coating, wherein the heat sealable layer is selected from the group consisting of a vinylidene chloride polymer layer and an acrylic polymer layer. U.S. Pat. No. 4,564,558 is incorporated by reference in its entirety for all that it discloses.

U.S. Pat. No. 5,093,194, incorporated herein by reference, discloses a multilayer oriented heat sealable structure, comprising a polyolefin film substrate, having on one surface a polymeric heat sealable layer comprising a terpolymer of propylene with ethylene and butene-1, and on the other a primer coating having thereon a water vapor and gas barrier layer comprising PVdC and inter polymer of acrylic acid and neutral monomer esters, e.g., methyl acrylate.

U.S. Pat. No. 5,194,318, incorporated herein by reference, discloses a metallized oriented film combination comprising a propylene homopolymer or copolymer substrate having a high density polyethylene skin layer with a thin metal layer deposited thereon. Optionally, the film combination can comprise a heat sealable polymer layer as well.

Despite these advances in the art, there exists a need for other multilayer heat sealable structures having improved properties, particularly with regard to film structures which can survive high altitude cross country overland shipping, without unacceptable levels of seal creep, preferably while maintaining a peelable seal. Moreover, there is a need for a film structure having enhanced puncture resistance, particularly for sharp-edged products, e.g., pretzels coated with salt crystals. Finally, it is desirable for such film structures to have high optic qualities, e.g., low haze levels.

It is an object of the present invention to provide an oriented polyolefin film which can be heat sealed.

It is yet another object of the present invention to provide a multilayer oriented film structure having adequate seal range and excellent bonding adhesion when laminated with polyethylene to a second film.

It is still a further object of the present invention to provide a multilayer oriented film structure for use in the packaging of foods having excellent sealability, seal integrity, peelable seal capability, transparency, and puncture resistance characteristics.

Other objects, aspects and the several advantages of the present invention will become apparent to those skilled in the art upon a reading of the specification and the claims appended thereto.

SUMMARY OF THE INVENTION

In accordance with the present invention there is provided an oriented heat sealable multilayer structure. The structure comprises:

(a) a core substrate having two surfaces, comprising i) a layer of homopolymer polyolefin and ii) a layer of block copolymer of ethylene and propylene having a MFR of 1 to 10, adjacent to at least one side of i);

(b) a polymeric heat sealable layer on one surface of said core substrate, said heat sealable layer comprising a polymeric material selected from the group consisting of a terpolymer of ethylene, propylene and butene-1, a random copolymer of ethylene and propylene, a random copolymer of propylene and butene-1, and blends thereof; and optionally, (c) a high density polyethylene (HDPE) layer adjacent to the other surface of said core substrate (a).

A method for producing an oriented heat sealable multilayer film structure is also provided. The method comprises:

(A) coextruding a coextrudate comprising (a) a core substrate having two surfaces, comprising i) a layer of homopolymer polyolefin and ii) a layer of block copolymer of ethylene and propylene having a MFR of 1 to 10, adjacent to at least one side of i);

(b) a polymeric heat sealable layer on one surface of said core substrate, said heat sealable layer comprising a polymeric material selected from the group consisting of a terpolymer of ethylene, propylene and butene-1, a random copolymer of ethylene and propylene, a random copolymer of propylene and butene-1, and blends thereof; and optionally, (c) a high density polyethylene (HDPE) layer adjacent to the other surface of said core substrate; and B) biaxially orienting the coextrudate.

In one embodiment, the present invention relates to the above multilayer structure wherein the polymeric heat sealable layer b) is adjacent to, i.e., in contact with, i) said homopolymer olefin of the core substrate (a). Alternatively, the polymeric heat sealable layer (b) can be adjacent to ii) the block copolymer of ethylene and propylene. Adjacent layers i) and ii) of (a) can be coextruded with layer b) as well. In one preferred embodiment, layers (a), (b), and (c) are coextruded.

The core substrate (a) of the present invention can be a 2-layer structure, i.e., i) homopolymer olefin layer and ii) block copolymer layer. Thus, ii) the layer of block copolymer is adjacent to only one side of i), said layer of homopolymer olefin. Alternatively, the present invention relates to a 3-layer structure comprising i) homopolymer olefin layer sandwiched between two ii) block copolymer layers. Thus, i) the layer of block copolymer is adjacent to each side of i) the layer of homopolymer olefin. Where the 2-layer core substrate is employed, the polymeric heat sealable layer (b) can be adjacent to either the i) homopolymer olefin layer, or alternatively, ii) the block copolymer layer. The high density polyethylene (HDPE) layer (c), when employed, is adjacent to the surface of the core substrate layer surface which is opposite the polymeric heat sealable layer (b).

Among the representative structures contemplated by the present invention are three layer structures such as HEAT SEALABLE LAYER/BLOCK COPOLYMER LAYER/HOMOPOLYMER OLEFIN LAYER; HEAT SEALABLE LAYER/HOMOPOLYMER OLEFIN LAYER/BLOCK COPOLYMER LAYER; four layer structures such as HEAT SEALABLE LAYER/BLOCK COPOLYMER LAYER/HOMOPOLYMER OLEFIN LAYER/HDPE LAYER; HEAT SEALABLE LAYER/HOMOPOLYMER OLEFIN LAYER/BLOCK COPOLYMER LAYER/HDPE LAYER; and five layer structures such as HEAT SEALABLE LAYER/BLOCK COPOLYMER LAYER/HOMOPOLYMER OLEFIN LAYER/BLOCK COPOLYMER LAYER/HDPE LAYER, wherein the homopolymer olefin layer is sandwiched between two block copolymer layers.

DETAILED DESCRIPTION OF THE INVENTION

Core Substrate

The polyolefins contemplated in the core substrate material of the subject film structure include homopolymers of polyethylene, polypropylene, and polybutene. Particularly preferred are homopolymers of polypropylene, e.g., an isotactic polypropylene containing at least 80 percent by weight of isotactic polypropylene. The polypropylene can have a melt flow index of from about 1 to about 8 g/10 minutes.

Preferred for use as a component layer of the core substrate layer are homopolymers of propylene. Propylene homopolymer is a well-known, commercially available polymer obtained by the stereoregular polymerization of propylene based on the use of Ziegler-Natta catalysts. Such catalysts generally are reaction products of an organometallic compound belonging to Groups IA to IIIA with a compound of a transition metal of Groups IVB to VIII. Propylene homopolymers and the preparation thereof are described in greater detail by G. Crespi and L. Luciani in "Olefin Polymers (Polypropylene)," *Kirk-Othmer Encyclopedia of Chemical Technology*, Third Edition, John Wiley & Sons, New York (1981), Volume 16, pages 453–469, the entire contents of which are incorporated by reference. Particularly preferred are propylene homopolymers having a melting point range of from about 321° F. to about 336° F. As mentioned, such materials are commercially available, for example Exxon 4612 polypropylene, and Fina 3371 polypropylene. Polypropylene made using metallocene catalysts can also be used.

The block copolymer of ethylene and propylene used in the core substrate is conveniently formed by the simultaneous polymerization of the respective monomers. Effective formation of a block copolymer of ethylene and propylene is accomplished by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of random copolymer. The copolymers can have a melt flow ranging, generally, from about 1 to about 10 g/10 minutes at 446° F. and preferably from about 3 to about 7 g/10 minutes. Himont 8523, commercially available from Himont Corp. of Wilmington, Del., and sold as a reactor block copolymer of PP and EP, having an MFR of 4, and a Tg of 0° C., is a suitable block copolymer for use as a layer of the core substrate as are block copolymers made with metallocene catalysts.

Heat Sealable Layer

The terpolymers contemplated herein as materials which may be selected for the heat sealable layer which can be coextruded with the core substrate are comparatively low stereoregular polymers. The terpolymers can have a melt flow index at 446° F. ranging from about 2 to about 16 g/10 minutes and preferably from about 3 to about 12 g/10 minutes. The crystalline melting point can range from about less than 250° F. to somewhat greater than 271° F. The terpolymers can range in average molecular weight from about 25,000 to about 100,000 and have a range of densities from about 0.87 to 0.92 gm/cm$^3$. The terpolymers will predominate in propylene and the ethylene and butene-1 monomers can be present in a mole percentage range of about 0.3:1.0 to about 1.0:0.3, in relation to each other. Examples of suitable terpolymers for the present invention include Chisso 7880 E-P-B terpolymer.

The ethylene-propylene random copolymer contemplated herein as a material for use in the heat sealable layer which can be coextruded with the base polyolefin, is conveniently formed by the simultaneous polymerization of the respective monomers. Effective formation of a random copolymer of ethylene and propylene is accomplished when the ethylene is present with polypropylene in an amount sufficient to result in from about 0.3 to about 10 percent by weight of ethylene in the resulting copolymer. This system is characterized by the random placement of the respective monomer units along the polymer chain. This is in contrast with a block copolymer of ethylene and propylene formed by sequential polymerization of the respective monomers. The feeding of the monomers in forming a block copolymer is controlled so that the monomer employed in one stage of the sequential polymerization is not added until the monomer employed in the preceding stage has been at least substantially consumed thereby insuring that the concentration of the monomer remaining from that preceding stage is sufficiently low to prevent formation of an excessive proportion of soluble random copolymer. The copolymers can have a melt flow index ranging, generally, from about 2 to about 15 g/10 minutes at 446° F. and preferably from about 3 to about 12 g/10 minutes. The crystalline melting point is usually from about 248° F. to about 300° F. and the number average molecular weight range is from about 25,000 to 100,000. The density of the copolymer will usually range from about 0.87 to about 0.92 g/cm$^3$.

Preferred random copolymers for use as the coextruded heat sealable layer, alone, or as part of a blend, are also commercially available materials. Particularly, preferred is a 3.5 percent ethylene content random copolymer, as well as a 6.5 percent ethylene content random copolymer. Another acceptable commercially available copolymer is a 1.5 percent ethylene content copolymer.

It is to be understood that blends of the aforementioned random copolymer of ethylene and propylene and the terpolymer of ethylene, propylene and butene-1 are useful in forming the polymeric heat sealable layer for coextruding with the core substrate layer and are within the scope of this invention. In general, when blends of the terpolymer and copolymer are used, the blends will contain from about 10 to about 90 weight percent of the terpolymer, preferably from about 40 to about 60 weight percent, the balance being made up of the ethylene-propylene random copolymer.

The preferred terpolymers for use as the coextruded heat sealable layer, or as part of a blend in the formation of same, are commercially available materials. Preferred terpolymers are those which contain no more than about 10 percent ethylene and no more than about 10 percent butene-1, the balance of the terpolymer consisting essentially of polypropylene. Such commercially available terpolymers will generally contain from about 1 to about 8 percent by weight of ethylene and from about 1 to 20 percent by weight of butene-1, having melting points from about 255° F. to about 266° F. A particularly preferred terpolymer for use in the practice of the present invention is known to have an ethylene monomer content of about 5 percent and a butene-1 monomer content also of about 5 percent. A still more particularly preferred terpolymer is known to have an ethylene monomer content of about 1% and a butene-1 monomer content of about 15 percent. As mentioned, such terpolymers are commercially available.

The heat-sealable layer can be in the form of a skin and may have a thickness of at least 2 to 20 gauge units, preferably 10 to 15 gauge units.

In preparing the multilayer structure of the present invention, the polypropylene/block copolymer substrate and the polymeric heat sealable layer consisting essentially of a terpolymer of ethylene, propylene and butene-1, a random copolymer of ethylene and propylene or a blend thereof, can be coextruded so that the polymeric heat sealable layer is from about 2 to about 12 percent of the total thickness of the two layers. In preparing the coextruded film it has been found advantageous and convenient to recycle certain quantities of scrap extrudate back into the base homopolymer of propylene. Thus, the homopolymer can have from 0 percent to about 15 percent of terpolymer, copolymer or copolymer-terpolymer blend therein.

The multilayer structure of the present invention can have an overall thickness which falls within a wide range of values. Preferably, however, the structure will have an overall thickness of from about 0.5 up to about 1.75 mils. The polymeric heat sealable layer of ethylene-propylene copolymer, ethylene-propylene-butene-1 terpolymer, or blends thereof, can be present in a thickness of from about 0.02 mils to about 0.20 mils.

Optionally, the heat sealable polymeric layer material can contain a minor amount of a wax, such as a microcrystalline or carnauba wax. When a microcrystalline wax is used, it is preferred that its softening point be less than about 200° F. The use of wax in the heat sealable polymeric layer results in several benefits to the overall multilayer film, among those being superior appearance through increased film clarity, improved film release characteristics during packaging operations as well as other improvements in the physical performance characteristics of the films, such as machining and compounding. Amounts of wax may vary from about 0.5 to about 18 weight percent of the overall heat seal layer composition. Microcrystalline waxes are effective in the polymeric heat sealable layer and, due to their lower cost, are preferred for use therein. Suitable waxes can be obtained from many commercial suppliers. The heat sealable polymeric layer, can also contain pigments, fillers, stabilizers, light protective agents or other suitable modifying agents if desired, as those skilled in the art would recognize.

High Density Polyethylene

The optional high density polyethylene layer can be employed for the purpose of providing a surface which can be metallized. Such material includes polyethylenes having a density of about 0.960 or greater. The high density polyethylene can be composed exclusively of a single high density polyethylene resin, a mixture of high density polyethylene resins or of high density polyethylene containing a minor proportion of about 10 wt. % microcrystalline wax. High density polyethylenes, as described in U.S. Pat. No. 4,870,122 issued to P. C. Lu, the disclosure of which is incorporated herein in its entirety, can be employed herein. Examples of suitable HDPE materials include Exxon HX0350.67 and Oxychem M6030.

The present invention also relates to a method of producing an oriented base film for metallization which exhibits superior metal adhesion in comparison to other oriented base films. This can be achieved by co-extruding the high density polyethylene skin layer with the propylene homopolymer/copolymer core substrate base and subsequently orienting the structure in the machine and transverse directions. Thereafter, the high density polyethylene surface is treated either by corona discharge treatment or by flame treatment. The corona discharge treatment can be to about 33–60 dynes/cm. and preferably to about 35–40 dynes/cm. Thereafter, the base film produced can be metallized by any known methods for example electroplating, sputtering and vacuum metallizing. A preferred method of metallizing the treated outer layer is by vacuum deposition. The metal coating can be any of the typical metals such as aluminum, copper, silver and chromium.

The metallized film produced exhibits excellent performance in conversion applications where a strong metal to base interface is critical. In adhesive and extrusion lamination applications, the metallized film exhibits superior bond strength and an absence of metal pick-off. This is believed to be equal to or better than other quality metallized propylene polymer films produced by the prior art. For example, in extrusion lamination at typical process conditions, the metallized propylene polymer film exhibits metallized film to high density polyethylene bond strengths in excess of 200 g/in. with 0% metal transfer from the metallized propylene polymer to the high density polyethylene.

In addition, it has been found that the film can be made metal fracture resistant in extrusion lamination by down gauging the thickness of the high density polyethylene skin layer. More specifically, for a total film thickness of from about 50–150 gauge units, say, 75 gauge units, if the high density polyethylene skin thickness is less than or equal to about 3 gauge units, the metallized high density polyethylene surface will exhibit excellent metal fracture resistance when contacted with a low density polyethylene melt during extrusion lamination.

When using the multilayer films of the present invention in the packaging of certain foods, particularly where a metallized layer is present, it is often desirable to laminate a second film thereto. As is a common practice in the art, extrusion lamination with polyethylene or polypropylene is generally employed to produce the desired lamination of the two films. Examples of such materials include a polypropylene or polyethylene film ranging from 20 to 40 gauge units, e.g., 25 to 35 gauge units.

Although it is not desirable in the practice of the present invention to surface treat the outer surface of the polymeric sealing layer coextruded to the polyolefin substrate layer, it can be desirable to surface treat that surface of the polyolefin substrate which is to be primed and coated with the water vapor and gas barrier layer. Such surface treatments may include the aforementioned corona discharge, flame or chemical oxidation treatments. Preferred for use in the practice of this invention are corona discharge or flame surface treatments, which can be carried out by one of the well known treatment methods. An example of a corona discharge method uses a procedure wherein a film is passed between two conductor elements which act as electrodes and a sufficiently high voltage is applied to enable corona discharges to take place. As a result of such discharges, the air above the surface of the film becomes ionized and combines with the molecules on the surface of the film so that polar incorporations are formed in the essentially non-polar polymeric matrix.

In the examples which follow, the base films are all biaxially oriented by conventional means. In general, this includes forming the base film in sheet form and machine direction orienting (MDO) or stretching the same at the appropriate or optimum temperature, using transport rollers operating at different speeds. After the desired degree of MDO is obtained, the film is transverse direction oriented (TDO), for example, in a tentering apparatus, to impart an orientation or stretching which is at right angles to the MDO. The extent of orientation can be from about 3 to about 10 times its original dimension for the MDO and from about 3 to about 10 times in the TDO.

The following specific examples are presented herein to illustrate particular embodiments of the present invention and hence are illustrative of this invention and not to be construed in a limiting sense.

EXAMPLE 1

A four layer biaxially oriented film having an approximate final thickness of 0.70 mil was prepared by coextruding the four layers including a dual core of block copolymer (Himont 523, commercially available from Himont Corp. of Wilmington, Del.) with a density of 0.90 and melting point of 160.8° C.) comprising 46% of the film thickness (32 gauge units after orienting), and polypropylene (Exxon 4612 polypropylene, with a density of 0.91 and melting point of 168° C.), comprising 29% of the film thickness (20 gauge units after orienting). The upper surface layer (adjacent to the polypropylene layer) is Exxon HX0350.67, a high density polyethylene polymer with a density of 0.95 and melting point of 135° C., comprising 4% of the total film thickness (3 gauge units after orienting). The lower surface layer (adjacent to the block copolymer layer) is a heat sealable resin comprising 21% of the total film thickness, (15 gauge units after orienting) Chisso 7880 E-P-B terpolymer, an ethylene-propylene-butene-1 terpolymer. The coextrudate was quenched at 30°–50° C., reheated to 115° C. and stretched in the machine direction 4.5 times using transport rolls operating at different speeds. After the desired machine direction orientation, the film was transversely oriented 8 times at an appropriate temperature profile ranging from 150° to 170° C.

The resulting film had an overall thickness of 0.70 mil with core layers of 0.20 mil (polypropylene) and 0.32 mil (block copolymer), with a thin HDPE layer of 0.03 mil and the bottom sealant terpolymer layer of 0.15 mil. Subsequently the HDPE metal receiving upper surface layer was treated with flame treatment.

EXAMPLE 2

The film structure of Example 1 was metallized by vacuum deposition of aluminum and tested for metal pick-off by Scotch 610™ tape available from 3M Corporation of Minneapolis, Minn. To test the metal adhesion, strips of the tape were applied to the metallized surface. The tape was pulled manually. At extreme testing conditions, the tape pull test was repeated three times with fresh tape applied to the same area. The percent of metal pick-off was recorded for comparison. Treatment samples with 33–40 dyne/cm treatment levels showed good metal adhesion after three tape pull tests.

Table 1 shows the resultant film properties prior to metallizing. A characteristic of these films is their striations parallel to the direction of major orientation.

Table 2 shows the resultant properties of the film after metallizing. The metallized upper layer was subsequently laminated to a layer of approximately 0.75 mil polypropylene film, with 10 pounds per ream of molten LDPE (density 0.90–0.92) at a melt temperature of 325° C. in a typical polylaminating machine, well known to those skilled in the art of poly laminating. Table 3 shows the resultant laminate properties.

having a MFR of 1 to 10, adjacent to only one side of i) said layer of homopolymer olefin.

4. The multilayer film structure of claim 3, wherein said polymeric heat sealable layer (b) is adjacent to i) said layer of homopolymer olefin.

5. The multilayer film structure of claim 1, wherein said layer of block copolymer of ethylene and propylene having

TABLE 1

| | Film Properties Prior to Metallization | | | | |
|---|---|---|---|---|---|
| EXAMPLE | TREATMENT LEVEL DYNES/CM | HAZE | WATER VAPOR TRANSMIS. | OXYGEN TRANS. | HERMETIC SEALS | CRIMP SEALS @ 260° F. |
| 0 | 37 | 2.0 | .54 | >129.0 | No | 400 |
| 1 | 37 | 5.5 | 0.54 | >129.0 | Yes* | 640 |

Film sample 0 = control film, typical OPP inside sealant web material
*Seal hermeticity is tested by a water submersion test and placing an 11 lb. force on the package.

TABLE 2

| | Film Properties After Metallization | | | | |
|---|---|---|---|---|---|
| EXAMPLE | LIGHT TRANSM. | WATER VAPOR TRANSM. | OXYGEN TRANS. | AROMA BARRIER | HERMETIC SEALS |
| 2 | 1.0% | 0.024 | 2.90 | No | Yes |

TABLE 3

| | Film Properties After Lamination | | | | | |
|---|---|---|---|---|---|---|
| EXAMPLE | LIGHT TRANSM. | WATER VAPOR TRANSM. | OXYGEN TRANSM. | CRIMP SEALS @ 260 F. | HIGH ALTITUDE DURABILITY | BOND STRENGTH 7D AGED |
| 0 | <1% | <0.02 | <2.0 | 600 | <3000 ft. | 250 |
| 1B | <1% | <0.02 | <2.0 | 1200 | >8700 ft.* | 250 |

Film sample 0 = control film, typical metallized OPP inside sealant web
*High Altitude Durability measured by vacuum chamber testing and determining the change in atmospheric pressure required to burst or delaminate samples.

It is claimed:

1. A biaxially oriented heat sealable multilayer film structure, comprising:
   (a) a core substrate having two surfaces, comprising i) a layer of homopolymer polyolefin and ii) a layer of block copolymer of ethylene and propylene having a MFR of 1 to 10, adjacent to at least one side of i);
   (b) a polymeric heat sealable layer on one surface of said core substrate, said heat sealable layer comprising a polymeric material selected from the group consisting of a terpolymer of ethylene, propylene and butene-1, a random copolymer of propylene and butene-1, and blends thereof; and optionally,
   (c) a high density polyethylene (HDPE) layer adjacent to the other surface of said core substrate (a).

2. The multilayer film structure of claim 1, wherein said homopolymer polyolefin is homopolymer polypropylene and said terpolymer of ethylene, propylene and butene-1 contains from about 1 to 8% by weight of ethylene and from about 1 to 15% by weight of butene-1.

3. The multilayer film structure of claim 1 comprising ii) said layer of block copolymer of ethylene and propylene a MFR of 1 to 10, is adjacent to each side of i) said layer of homopolymer olefin.

6. The multilayer film structure of claim 1, wherein said polymeric heat sealable layer (b) is adjacent to ii) said layer of block copolymer of ethylene and propylene.

7. The multilayer film structure of claim 1, wherein said layers of (a) are coextruded.

8. The multilayer film structure of claim 7, wherein (a) and (b) are coextruded.

9. The multilayer film structure of claim 8, wherein (a), (b) and (c) are coextruded.

10. The multilayer film structure of claim 1, wherein the surface of (c) opposite said core substrate (a) is surface treated using a surface treatment technique selected from the group consisting of flame treatment and corona discharge treatment.

11. The multilayer film structure of claim 10, wherein said surface treated surface is further treated by metallizing.

12. The multilayer film structure of claim 11, wherein said metallizing is carried out by vacuum deposition of aluminum.

13. The multilayer film structure of claim 12 which further comprises a polypropylene film laminated to said metallized surface.

14. A method for producing an oriented heat sealable multilayer film structure, comprising:
   (A) coextruding a coextrudate comprising
      (a) a core substrate having two surfaces, comprising i) a layer of homopolymer polyolefin and ii) a layer of block copolymer of ethylene and propylene having a MFR of 1 to 10, adjacent to at least one side of i);
      (b) a polymeric heat sealable layer on one surface of said core substrate, said heat sealable layer comprising a polymeric material selected from the group consisting of a terpolymer of ethylene, propylene and butene-1, a random copolymer of propylene and butene-1, and blends thereof; and optionally,
      (c) a high density polyethylene (HDPE) layer adjacent to the other surface of said core substrate; and
   B) biaxially orienting the coextrudate.

15. The method of claim 14 which further comprises
   C) surface treating (c) the high density polyethylene (HDPE) layer of the biaxially oriented coextrudate using a surface treatment technique selected from the group consisting of flame treatment and corona discharge treatment.

16. The method of claim 15 which further comprises
   D) treating said high density polyethylene (HDPE) layer by depositing a thin metal layer thereon.

17. The method of claim 16 wherein said depositing is carried out by vacuum deposition of aluminum.

18. The method of claim 16 which further comprises laminating the treated HDPE layer resulting from depositing a thin metal layer thereon of said oriented heat sealable multilayer structure to a polypropylene film.

* * * * *